Figure 4:
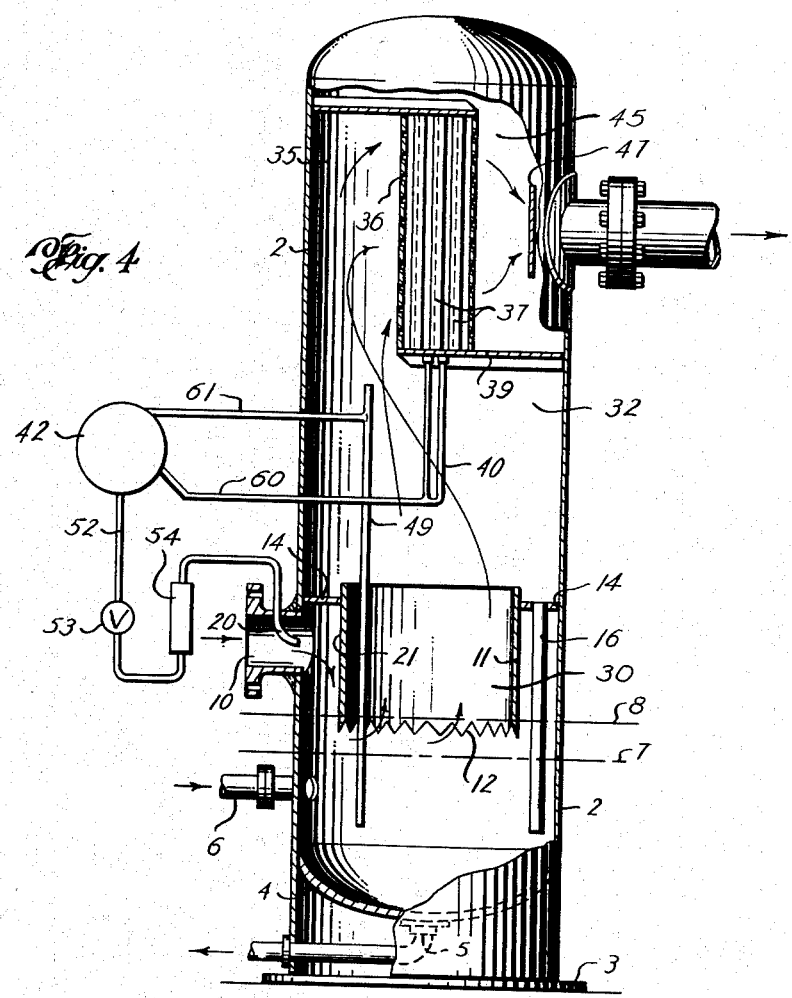

Aug. 24, 1954  A. J. L. HUTCHINSON ET AL  2,687,184
VARIABLE CAPACITY DUST REMOVER SCRUBBER
Filed Oct. 10, 1949  2 Sheets-Sheet 1
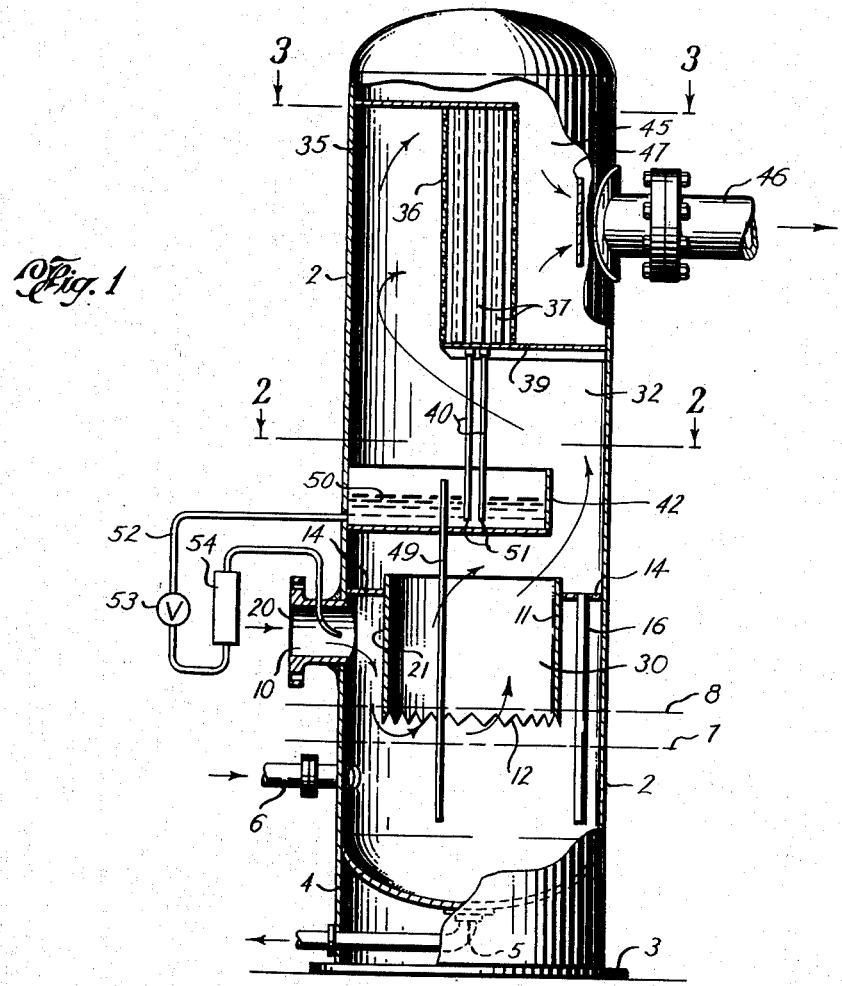
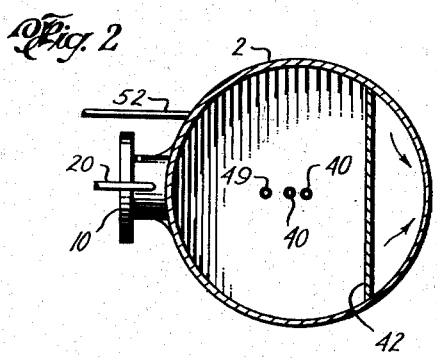
Arthur J. L. Hutchinson
Ray C. Fish
Paul Hall
INVENTORS
BY Lester B. Clark
& Ray L. Smith
ATTORNEYS Aug. 24, 1954  A. J. L. HUTCHINSON ET AL  2,687,184
VARIABLE CAPACITY DUST REMOVER SCRUBBER
Filed Oct. 10, 1949  2 Sheets-Sheet 2

Arthur J. L. Hutchinson
Ray C. Fish
Paul Hall
INVENTORS

BY Lester B. Clark
& Ray L. Smith
ATTORNEYS

Patented Aug. 24, 1954

2,687,184

UNITED STATES PATENT OFFICE 2,687,184

VARIABLE CAPACITY DUST REMOVER SCRUBBER

Arthur J. L. Hutchinson, Ray C. Fish, and Paul Hall, Houston, Tex., assignors to The Fish Engineering Corporation, Houston, Tex., a corporation of Delaware Application October 10, 1949, Serial No. 120,544

3 Claims. (Cl. 183—22)

1

The invention relates to a scrubber for removing dust from gaseous fluids by submitting the gas to an oil bath where the volume of oil is varied as a function of the variation in the volume of gas.

When the volume of gas passing through a dust scrubber varies, the volume of oil picked up by the gas must of necessity vary accordingly if there is to be a uniform scrubbing action.

With the dust scrubbers now in general use considerable difficulty is encountered in varying the oil pickup as a function of the volume of gas, and the present invention is directed to a means and method of varying the pickup.

It is one of the objects of the invention to provide a storage reservoir in an oil-bath dust type of scrubber so that the excess oil picked up by a larger volume of gas flow will be restricted in its return to the circulating system in order to control the pickup as a function of the volume of gas.

Another object of the invention is to provide an oil-bath dust scrubber having an oil storage reservoir, an oil, dust and gas mixing chamber, an oil disengaging chamber, and an extractor area in combination with a storage reservoir which serves to restrict the return of oil to the mixing chamber or storage reservoir in accordance with the volume of flow of the gas.

Another object of the invention is to provide an oil feeder in the gas inlet of a dust scrubber in combination with a storage reservoir so as to control the rate of inlet of oil.

Another object of the invention is to remove and store excess oil picked up by large volumes of gas in a dust scrubber and to restrict the return of such excess oil to the circulating system in accordance with the volume of flow of gas.

Still another object of the invention is to provide a variable oil-gas contact level in a dust scrubber wherein the level varies as a function of the volume of gas passing through the scrubber.

A still further object of the invention is to store the removed oil in a gas dust scrubber and to return such oil to the system so as to control the oil-gas contact level as a function of the volume of gas.

Another object of the invention is to return extracted oil to the circulating system in a gas dust scrubber at a uniform rate so as to control the level of the oil-gas contact in accordance with the volume of flow.

A still further object of the invention is to reduce the oil-gas contact level in a dust scrubber upon an increase in the gas flow by storing and retarding the return of the extracted oil to the circulating system.

Figure 3:
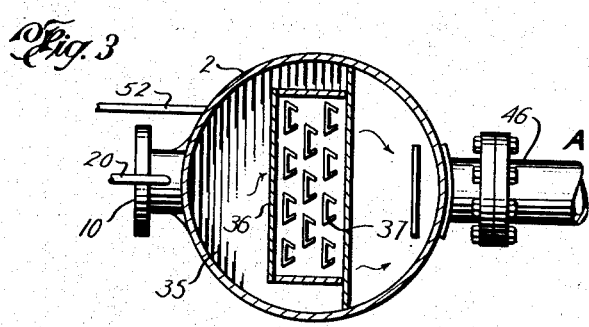

Other and further objects of the invention will be readily apparent when the following description is considered in connection with the accompanying drawings, wherein:

Figure 1 is a vertical sectional view through the equipment utilized in practicing the invention;

Figures 2 and 3 are sections taken, respectively, on the lines 2—2 and 3—3 of Fig. 1;

Fig. 4 shows a modified form of the structure of Fig. 1 where the oil storage reservoir is disposed outside of the scrubber housing.

In Fig. 1 the scrubber is generally illustrated by a housing 2 disposed upon a footing or foundation 3. This housing is in the form of a vertical cylinder having a curved bottom 4, from which the dirty oil outlet 5 extends.

A clean oil inlet 6 enters the housing adjacent the lower portion thereof so as to maintain a body of oil in the chamber having an oil-gas contact level 7 or 8, as will be explained, thus forming an oil supply reservoir in the bottom of said chamber.

A gas inlet 10 is disposed in the side of the housing so that the incoming stream of gas will impinge upon the baffle 11, which is in the form of a hollow cylinder having a lower serrated edge 12, which is shown as extending down to the oil level 8 to above the oil level 7.

In order to compel the incoming gas to impinge against the baffle 11 and pass downwardly around the serrated edge 12, a partition 14 is arranged inside of the housing, and closing off the housing around the outside of the baffle 11.

A drain pipe 16 extends downwardly from this partition into the supply reservoir.

It seems obvious that the incoming gas will impinge against the baffle 11 and be driven downwardly to contact the oil at the level 8. The oil will be agitated and the gas, due to the pressure below the partition 14, will be caused to flow around the serrated edge 12. In this manner the gas is compelled to contact the oil, so that there is an intimate mixing of the oil and the gas at the upper part of the body of oil, so that any dust carried by the gas will come in contact with the oil.

To further emphasize the mixing action of the oil and the dust, an oil inlet pipe 20 is shown as being disposed in the gas inlet 10 so that oil dripping or spraying from this inlet pipe 20 will be carried along with the gas and caused to impinge against the surface 21 of the baffle 11.

The oil and dust commingled together will either drain down the surface 21 of the baffle or will fall off in cake form.

It seems obvious that more oil will be picked up by the gas if the oil contact level is at 8 than if the oil contact were lower, as at 7. This is true because at the level 7 there is a free passage of gas around the lower serrated edge 12 of the baffle 11, whereas if the level were at 8 the gas would have to agitate the oil and bubble therethrough as it passes the serrations 12.

The gas leaves the entrance or mixing chamber 30 by moving upwardly through the hollow cylindrical baffle 11 to an elevation above the partition 14.

The central part of the housing 2 will be designated as a disengaging chamber 32. It seems clear that due to the fact that the chamber 32 constitutes a greater area than the inside of the baffle 11, the rate of flow of the gas carrying the oil will slow down and be somewhat less, and there will be a tendency for the larger droplets of oil to settle out of the gaseous fluid. These droplets of oil which settle out of the stream of gas by gravity will fall upon the partition 14 and flow through the return pipe 16 to the body of oil in the supply reservoir. The flow of gas will continue on through the disengaging chamber 32 and into the area 35 adjacent the upper end of the housing in such manner that the gas will be directed through the perforated area 36 and against the mist extracting vanes 37, which are vertically arranged, as best seen in Fig. 3. The principal object of the mist extracting vanes or baffles is to sharply change the direction of flow of the gas so that the larger particles of oil will be thrown out upon the sharp changes in direction of the flow of gas.

The oil accumulating on the baffles or vanes 37 will move downwardly by gravity upon the base 39 and pass through the pipes 40 into a reservoir or storage pan 42 which is arranged in the disengaging chamber 32, as seen in Fig. 1 or into the storage reservoir as seen in Fig. 4.

The gas from which the oil is disengaged and extracted will then pass into the outlet chamber 45 and thence through the gas outlet 46 of the scrubber. A suitable baffle 47 may be arranged ahead of the outlet to create further turbulence of the flowing gas and accordingly effect a final separation of oil from the gas.

It seems obvious that if the oil from the extractor pipes 40 were directly returned to the mixing chamber that then the oil level in the supply reservoir would remain constant, irrespective of the volume of flow of gas, because the oil would be returned at substantially the same rate at which it was entrained.

The present invention, therefore, contemplates the reservoir 42 in which a body 50 of oil will accumulate, and this body of oil 50 must at all times cover the lower ends 51 of the return pipes so as to maintain a seal in the extractors 37. An overflow pipe 49 provides for return of oil to the mixing chamber.

It is intended that the reservoir 42 will serve as a storage space for the oil which is extracted from the gas. A flow pipe 52 extends from the reservoir 42 through a control valve 53 and a meter 54, where it finally discharges through the pipe 20 into the incoming gas. If a large volume of gas enters the scrubber, the larger volume will, of course, pick up a larger quantity of oil, which will be first disengaged and then extracted and returned to the reservoir 42.

If the volume of flow of gas is such that the oil is picked up at a greater rate than may be adjustably controlled by the valve 53 and meter 54, then, of course, there will be an accumulation and storage of this excess oil in the reservoir 42.

Inasmuch as there is only a predetermined volume of oil in the system, it follows that any volume of oil stored in the reservoir 42 reduces the volume of oil being circulated in a corresponding amount, and the retention of this body of oil in the reservoir 42 results in a reduction of the oil level in the supply reservoir, say, from the initial level at 8 to the level at 7.

In actual operation, if the volume of gas entering the scrubber increases, it will of necessity pick up more oil than would a lesser volume of gas. This oil is then disengaged in the chamber 32 and extracted in the mist extractor and returned to the reservoir 42. If all of this oil could immediately return to the body of oil in the mixing chamber, then the oil level 8 would probably be maintained until it was reduced due to unrecovered oil passing out of the discharge 46 with the gas. The provision of the storage reservoir 42 and the flow control means, however, prevents the immediate return of all of this extracted oil to the system and retards its return in accordance with the adjustment of the valve 53 or the meter 54, so that there is a consequent reduction in the oil level from 8 down to, say, 7. At the level 7 there is less contact of the gas with the oil than at the level 8, and accordingly less oil is picked up, so that the disengaging chamber and the mist extractor will not be overloaded with an excess of oil due to the larger volume of gas flow.

When the level at 7 is reduced to where the pickup is less than the return through the oil inlet 20, then the oil level will again begin to rise from 7 to 8, so that the oil level is automatically changed due to the variation in the volume of flow of the gas. When the oil level reduces, the pickup is reduced. It, therefore, appears that the variation in the oil level occurs as a function in the variation of the volume of flow of gas because of the provision of the storage reservoir 42.

With a scrubber equipped with the storage reservoir and control of the levels 7 and 8, it seems obvious that a more efficient dust scrubbing will occur, and excess oil will not be carried from the scrubber.

New oil may be continuously or intermittently introduced through the inlet 6 and the dirty oil discharged through the outlet 5, as may be desired.

The provision of the reservoir 42 in the form of a pan or tray in the disengaging chamber catches considerable of the disengaged oil and its return to the supply reservoir, together with the extracted oil, is controlled as explained above.

In Fig. 4 a modified arrangement is provided wherein the storage tank or reservoir 42 has been disposed exteriorly of the housing 2 and the drain or return pipes 40 for the extracted oil are connected to the return pipe 60 leading to the tank. An overflow pipe 61 leads from the tank back to the return pipe 49, which serves the same purpose as the pipe 49 in the Figure 1 form.

Broadly the invention contemplates a control of the extracted oil in a dust scrubber so that the oil may be returned to the scrubber at a rate such that the oil-gas contact level will vary as a function of the fluctuation in volume of gas passing through the scrubber.

What is claimed is:

1. A scrubber to remove dust and foreign matter from a gas stream, comprising a housing, an oil supply reservoir therein, means for continuously maintaining a body of oil in said oil supply reservoir, a mixing chamber in communication with said oil supply reservoir, a mist extractor to remove suspended oil particles from the gas, means for collecting extracted oil, an oil storage reservoir, means for conducting the collected extracted oil directly from said collecting means to said oil storage reservoir, a conduit for continuously returning collected oil from said oil storage reservoir to said oil supply reservoir, flow control means in said conduit to control the continuous flow of oil from said storage reservoir to said oil supply reservoir at a predetermined constant rate independent of the rate of flow of said gas.

2. A scrubber to remove dust and foreign matter from a gas stream, comprising a housing, an oil supply reservoir therein, means for continuously maintaining a body of oil in said oil supply reservoir, a mixing chamber in communication with said oil supply reservoir, means for contacting incoming gas with said body of oil thereby picking up a portion of the oil as droplets or a mist, an oil disengaging chamber, means for continuously returning disengaged oil directly to said oil supply reservoir, a mist extractor to remove suspended oil particles from the gas, means for collecting extracted oil, an oil storage reservoir, means for conducting the collected extracted oil directly from said collecting means to said oil storage reservoir, a conduit for continuously returning collected oil from said oil storage reservoir to said oil supply reservoir, flow control means in said conduit to control the continuous flow of oil from said storage reservoir to said oil supply reservoir at a predetermined constant rate independent of the rate of flow of said gas.

3. A gas liquid-scrubber comprising a vertical shell, means dividing said shell into an upper chamber and a lower chamber, a gas inlet near the upper part of the lower chamber, a baffle located in said lower chamber and depending through the dividing means to a point below the gas inlet and into an oil supply reservoir, an oil supply reservoir in the lower part of said lower chamber, said baffle forming a gas passageway between said supply reservoir and the upper chamber whereby incoming gas passes under said baffle in contact with the oil, is mixed with oil in the reservoir forming a mixture of gas and droplets or mist which passes upwardly into the upper chamber, means for continuously maintaining a body of oil in said reservoir; means dividing the upper chamber into an oil-gas disengaging zone and a mist extraction zone, a mist extractor in said extraction zone, means for collecting extracted oil in said extraction zone, a storage reservoir, means for conducting extracted oil from said extraction zone directly to said storage reservoir, means for continuously returning disengaged oil from the disengaging zone directly to said supply reservoir, flow means for passing oil continuously from the storage reservoir to the supply reservoir, and control means in said flow means to maintain a predetermined constant continuous flow of said oil from the storage reservoir to the supply reservoir irrespective of the rate of gas feed to the lower chamber.

References Cited in the file of this patent

UNITED STATES PATENTS

| Number | Name | Date |
|---|---|---|
| 1,821,619 | Day | Sept. 1, 1931 |
| 2,157,305 | Raymond | May 9, 1939 |
| 2,207,774 | Barthelemy | July 16, 1940 |
| 2,239,620 | Neumann | Apr. 22, 1941 |
| 2,354,674 | Fisher | Aug. 1, 1944 |

FOREIGN PATENTS

| Number | Country | Date |
|---|---|---|
| 573,614 | Great Britain | Nov. 28, 1945 |
| 706,167 | Germany | May 19, 1941 |
| 114,243 | Australia | Nov. 17, 1941 |
| 195,944 | Switzerland | May 16, 1938 |